US011573317B2

(12) United States Patent
Thoresen et al.

(10) Patent No.: US 11,573,317 B2
(45) Date of Patent: *Feb. 7, 2023

(54) AUGMENTED REALITY PLATFORM AND METHOD FOR USE OF SAME

(71) Applicant: Scrrd, Inc., Seattle, WA (US)

(72) Inventors: Lucas Kane Thoresen, Seattle, WA (US); Joshua I. Cohen, Seattle, WA (US)

(73) Assignee: Scrrd, Inc., Seattle, WA (US)

( * ) Notice: Subject to any disclaimer, the term of this patent is extended or adjusted under 35 U.S.C. 154(b) by 116 days.

This patent is subject to a terminal disclaimer.

(21) Appl. No.: 17/222,928

(22) Filed: Apr. 5, 2021

(65) Prior Publication Data

US 2021/0318428 A1    Oct. 14, 2021

Related U.S. Application Data

(63) Continuation of application No. 16/898,067, filed on Jun. 10, 2020, now Pat. No. 10,969,486, which is a continuation-in-part of application No. PCT/US2019/029507, filed on Apr. 26, 2019.

(60) Provisional application No. 62/859,462, filed on Jun. 10, 2019, provisional application No. 62/663,012, filed on Apr. 26, 2018.

(51) Int. Cl.
| | |
|---|---|
| *G01S 13/89* | (2006.01) |
| *G01S 13/06* | (2006.01) |
| *G06T 19/00* | (2011.01) |
| *G01S 13/87* | (2006.01) |
| *G01S 13/86* | (2006.01) |

(52) U.S. Cl.
CPC .............. *G01S 13/89* (2013.01); *G01S 13/06* (2013.01); *G01S 13/867* (2013.01); *G01S 13/876* (2013.01); *G06T 19/006* (2013.01)

(58) Field of Classification Search
CPC ...... G01S 13/06; G01S 13/867; G01S 13/876; G01S 13/89; G06T 19/006
See application file for complete search history.

(56) References Cited

U.S. PATENT DOCUMENTS

| | | |
|---|---|---|
| 6,307,475 B1 | 10/2001 | Kelley |
| 2011/0273321 A1 | 11/2011 | Joshi |
| 2013/0044128 A1 | 2/2013 | Liu |
| 2013/0222371 A1 | 8/2013 | Reitan |
| 2013/0342564 A1 | 12/2013 | Kinnebrew |
| 2015/0116144 A1 | 4/2015 | Serrano Olmedo |
| 2015/0302665 A1 | 10/2015 | Miller |
| 2015/0382148 A1 | 12/2015 | Agarwal |
| 2018/0365898 A1 | 12/2018 | Costa |
| 2019/0043259 A1 | 2/2019 | Wang |

(Continued)

*Primary Examiner* — Timothy X Pham
(74) *Attorney, Agent, or Firm* — Loginov & Associates, PLLC; William A. Loginov (57) ABSTRACT

An augmented reality platform and method for use of the same are provided. In one embodiment, an array of locationing devices determine a perspective value of a physical object within a space based on visual-inertial odometry, radio wave positioning, and acoustic positioning. A server determines a decided value of the physical object based on a plurality of perspective values of the physical object received from the array of locationing devices. A digital map and digital library maintained by the server maintain the location of physical objects and spatial experiential objects in order to provide the spatial experiential object to an augmented reality device.

17 Claims, 6 Drawing Sheets

(56) References Cited

U.S. PATENT DOCUMENTS

2020/0074743 A1 3/2020 Zheng
2020/0118290 A1 4/2020 Liu

AUGMENTED REALITY PLATFORM AND METHOD FOR USE OF SAME

PRIORITY STATEMENT & CROSS-REFERENCE TO RELATED APPLICATIONS

This application claims priority from U.S. Patent Application Ser. No. 62/859,462 entitled "Augmented Reality Platform and Method for Use of Same" and filed on Jun. 10, 2019, in the names of Joshua Ian Cohen et al.; which is hereby incorporated by reference, in entirety, for all purposes. This application is also a regular national application filed under 35 U.S.C. § 1.111(a) claiming priority under 35 U.S.C. § 120 to the Apr. 26, 2019 filing date of International Application Serial No. PCT/US2019/029507, which designates the United States, filed in the names of Joshua Ian Cohen et al. and entitled "Augmented Reality Platform and Method for Use of Same;" which claims priority from U.S. Patent Application Ser. No. 62/663,012, entitled "Enhanced Reality Shareable Grid" and filed on Apr. 26, 2018, in the names of Gavin Johnson et al.; both of which are hereby incorporated by reference, in entirety, for all purposes.

TECHNICAL FIELD OF THE INVENTION

This invention relates, in general, to augmented reality platforms and, in particular, to enhanced performance in systems and methods for providing augmented reality with the geospatial correlation of augmented reality objects.

BACKGROUND OF THE INVENTION

Augmented reality, including virtual reality, adoption has been accelerating with the saturation of smartphones, glasses, technologically enhanced lenses and synchronized matrixes of light in society. The individual interactions with 2-dimensional (2D) and/or 3-dimensional (3D) digital renderings has relied on a personal interface with cameras of devices capturing their environment, before injecting visual objects rendered with code.

This individual relationship with digital renderings in augmented reality is a consequence of how difficult accurate placement of renderings is in a digitally enhanced environment between users. Sharable experiences require complex calibrated equipment to analyze environmental surroundings, and cameras lack the ability to effectively solve the re-localization of digitally rendered objects. Occlusion is another obstacle challenging the augmented reality experiences between users of devices until realistic object metrics are graphed with precision accuracy. As a result of limitations in existing augmented reality technology, there is a need for improved augmented reality with the geospatial correlation of augmented reality objects.

SUMMARY OF THE INVENTION

It would be advantageous to achieve systems and methods for providing augmented reality with the geospatial correlation of augmented reality objects that would improve upon existing limitations in functionality. It would be desirable to enable an electrical engineering-based and software solution that would provide enhanced geolocationing in an easy-to-use platform independent environment. To better address one or more of these concerns, an augmented reality platform and method for use of the same are provided.

In one embodiment of the augmented reality platform, an array of locationing devices determines a perspective value of a physical object within a space based on visual-inertial odometry, radio wave positioning, and acoustic positioning. A server determines a decided value of the physical object based on a plurality of perspective values of the physical object received from the array of locationing devices. A digital map and digital library maintained by the server maintain the location of physical objects and spatial experiential objects in order to provide the spatial experiential object to an augmented reality device.

In one aspect, the teachings presented herein provide a mesh topography of network devices synchronizing geospatial correlation(s) within at least one (1) digital graph mainframe using metrics of cubic meters or less is provided to be utilized through technologically enhanced lenses and/or light matrix mediums for AR and/or VR purposes. This implementation of unique 2D and/or 3D objects in shared networks allows connected devices to accurately render precision in topographic regions real-time between visual mediums by more than one person privately and/or publicly. Groups may monetize networks of topographic regions for placing more precise virtual objects by sharing relative coordinates from devices and/or correlating connected servers with an original multi-planar grid graphing one (1) meter axis metrics or less. Multi-dimensional renderings may include sub-graphs for processing properties within an original universal digital framework. The groups associated with networks connecting devices to servers may form virtual objects to place within the original graph and/or subgraph and/or sharable grids of topographic regions with a mobile app from the iOS and/or Android platforms by themselves between privatized device creation interactions and/or public forum correspondences featuring personal renderings without limiting the scope of art for this invention.

Hardware may necessarily synchronize network correlation metrics within meshed topographies and/or an original graph digitally placing sharable virtual object coordinates to chart accurate universal grid renderings. Multi-dimensional virtual objects in topographic regions may be correlated with more precision coordination relative to each network connected device environmental analysis of renderings subject to adjacent graphs outlined through multiple calibration techniques. These and other aspects of the invention will be apparent from and elucidated with reference to the embodiments described hereinafter.

BRIEF DESCRIPTION OF THE DRAWINGS

For a more complete understanding of the features and advantages of the present invention, reference is now made to the detailed description of the invention along with the accompanying figures in which corresponding numerals in the different figures refer to corresponding parts and in which.

DETAILED DESCRIPTION OF THE INVENTION

While the making and using of various embodiments of the present invention are discussed in detail below, it should be appreciated that the present invention provides many applicable inventive concepts, which can be embodied in a wide variety of specific contexts. The specific embodiments discussed herein are merely illustrative of specific ways to make and use the invention, and do not delimit the scope of the present invention.

Figure 1A:
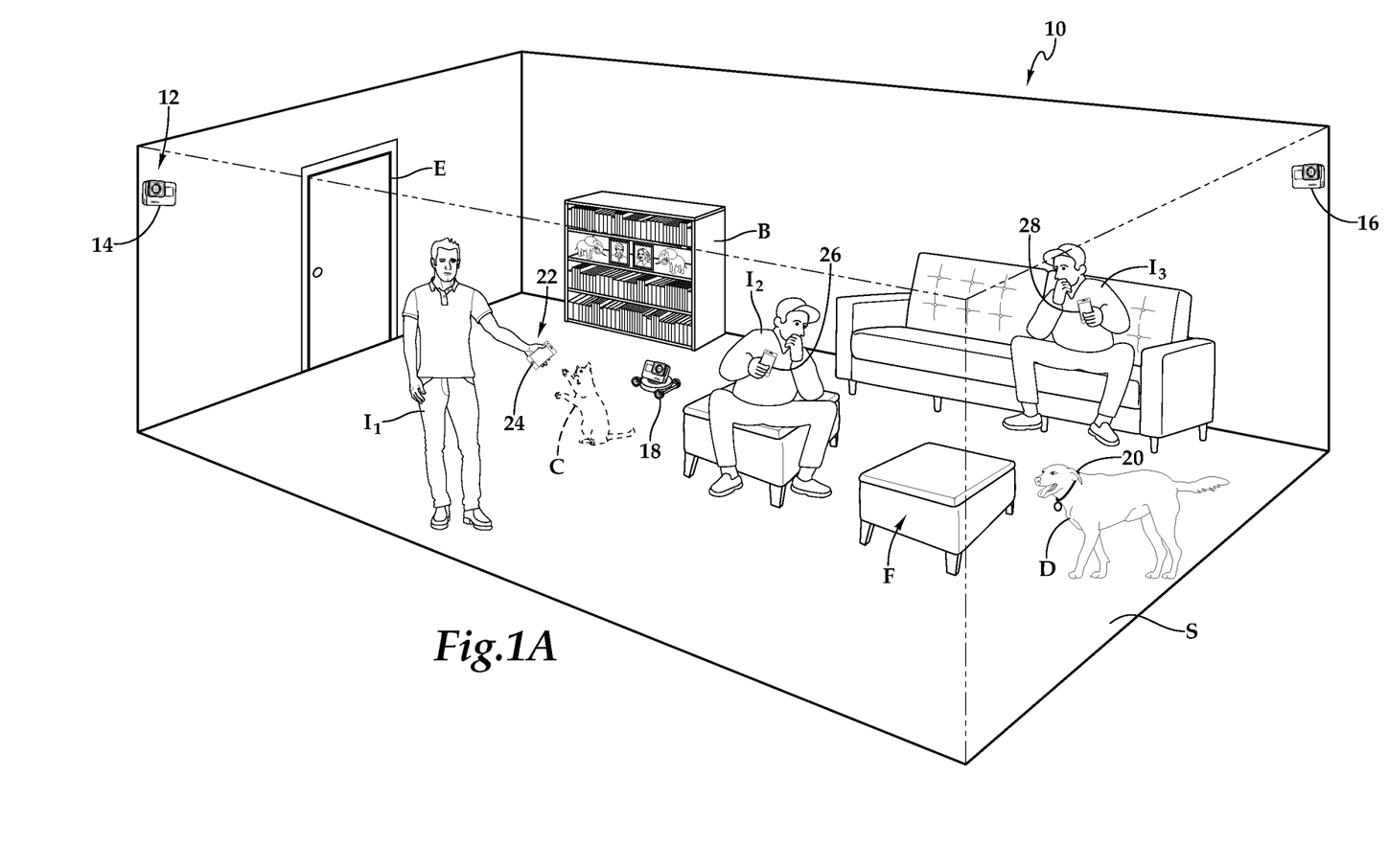
FIG. 1A is a schematic floor plan depicting one embodiment of an augmented reality platform according to the teachings presented herein.
Figure 1B:
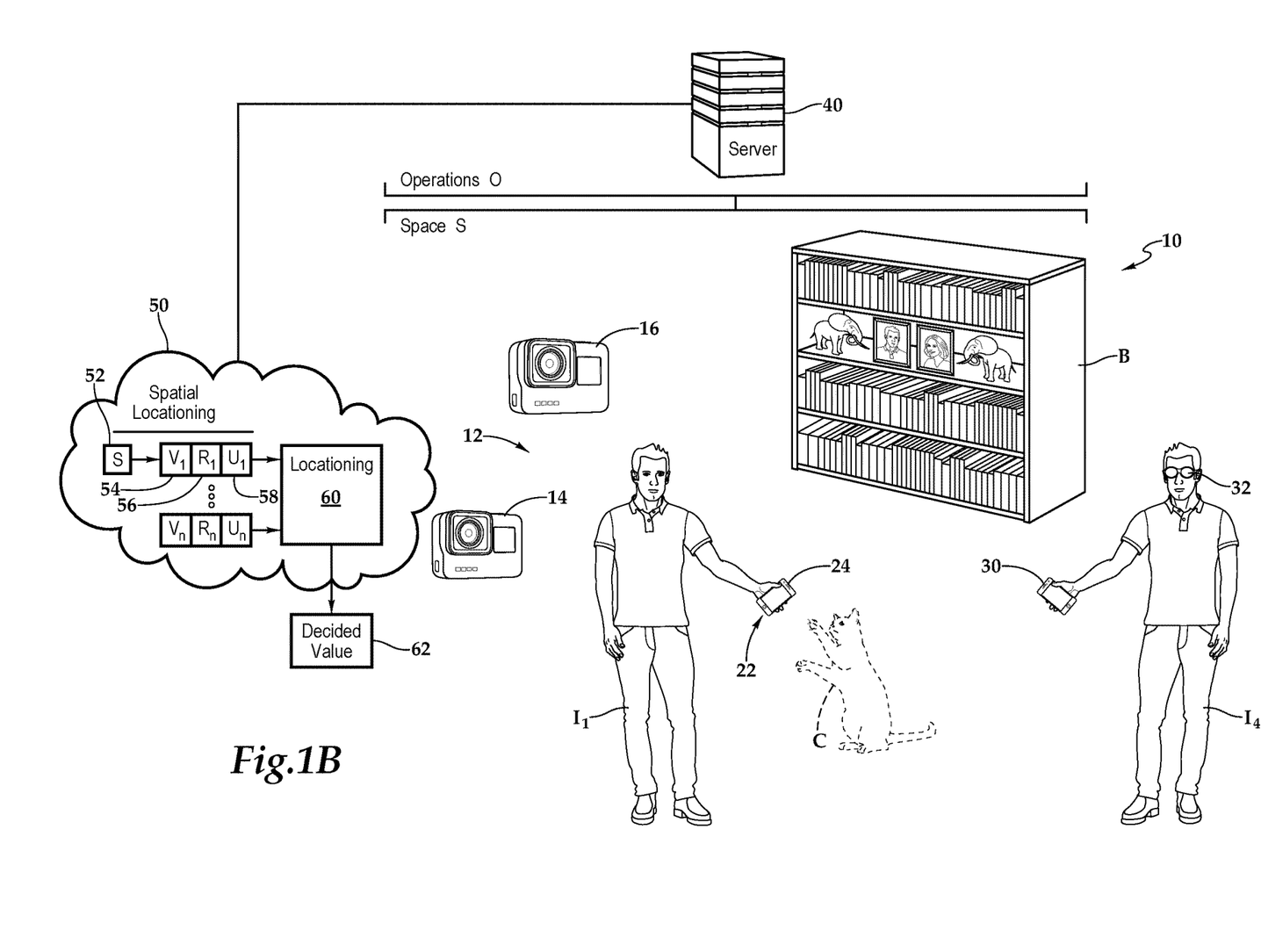
FIG. 1B is a schematic diagram of the augmented reality platform presented in FIG. 1A in a first operational mode.
Figure 1C:
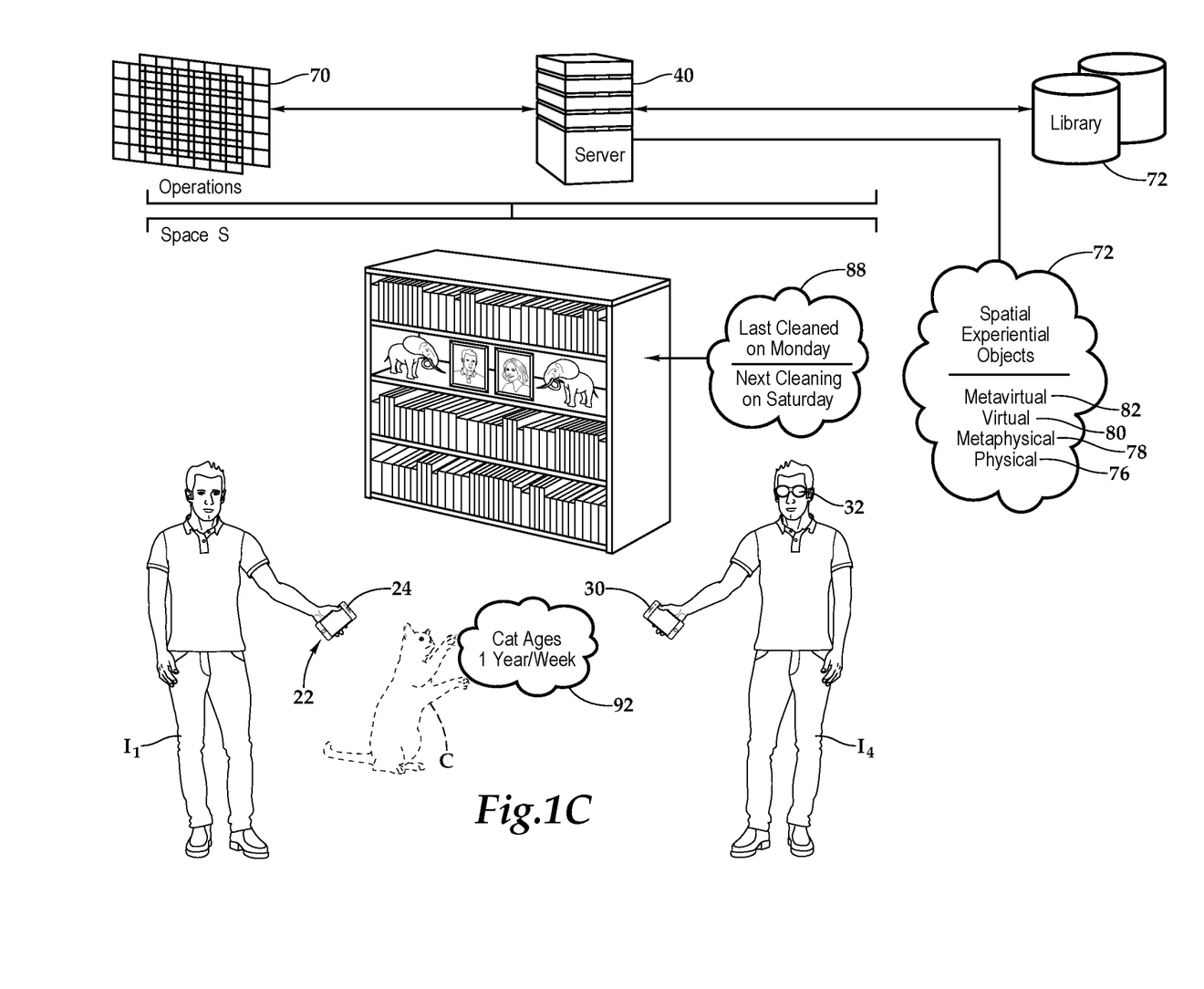
FIG. 1C is a schematic diagram of the augmented reality platform presented in FIG. 1A in a second operational mode.

Referring initially to FIG. 1A, FIG. 1B, and FIG. 1C, therein is depicted an augmented reality platform, which is schematically illustrated and designated 10. A space S, which is depicted as a living room, has an entrance E to the living room, which is furnished with seating F and a bookcase B. Individuals $I_1$, $I_2$, $I_3$, $I_4$ are within the space S and moving into and out of the living room. A dog D and a virtual cat C are also within the room.

The augmented reality platform 10 includes an array of locationing devices 12 within the space S. As shown, the locationing devices 12 include camera nodes 14, 16, a robotic camera node 18, and a collar-mounted camera node 20, as well. Each of the locationing devices 12 has a locationing device identification providing an accurately-known location within the space S. Each of the Individuals $I_1$, $I_2$, $I_3$, and $I_4$ is utilizing an augmented reality device 22 and more particularly individual $I_1$ is utilizing a smart phone 24. Individual $I_2$ and Individual $I_3$ are respectively utilizing smart phones 26, 28. Individual $I_4$ is utilizing smart phone 30 and smart glasses 32. As shown, a server 40 is remotely located to the space in Operations O and in communication with the array of locationing devices 12 as well as the augmented reality devices 22. The augmented reality devices 22 may be any type of programmable wireless-enabled carryable or wearable device, including, but not limited to, smart phones, tablet computers, laptop computers, smart watches, smart pendants, and smart badges.

In one implementation, as a part of spatial locationing 50, each of the locationing devices 12, including the augmented reality devices 22, determines a perspective value of a physical object, such as the bookshelf B, within the space S based on signaling 52 which includes visual-inertial odometry 54, radio wave positioning 56, and acoustic positioning 58. As part of locationing 60, each of the locationing devices 12, including the augmented reality devices 22, determine a perspective value relative to the geospatial location of the physical object.

As part of the spatial locationing 50, the server determines a decided value 62 of the physical object based on the perspective values of the physical object received from the array of locationing devices 12 and the augmented reality devices 22. A digital map 70 is maintained by the server 40 based on the determined values of the physical objects.

With respect to one embodiment of the digital map 70, the earth has a radius of 6.371 million meters with an iron core central point shown respectively assigned 0, 0, 0 on a graph of X, Y, Z axis planes. When each magnetic pole of Earth sets the Y-axis and our equator is perpendicular to the X-axis and Z-axis planes a digital graph of one (1.0) meter or less metrics is constructible within a digital realm. A spatial experiential object may be placed within a frame of graphs metered on the positive X-axis, positive Y-axis, and negative Z-axis to demonstrate a one (1.0) cubic meter grey cube at the center of the earth. Grids may expand from any digital axis in all directions to collaborate with independent and/or dependent graphs of renderings in motion without limiting the scope of this art. A virtual object may include 2D and/or 3D shapes of various size(s), color(s), pattern(s), graph(s), sub-graph(s), grid(s), chart(s), dimension(s), multi-dimensional rendering(s), presence(s), atmospheric pressure(s), virtual walls, virtual ceilings, planar axis chart(s) formulation(s), bits, coordinated light spectrum(s), water droplet(s), cloud(s), cosmic ray(s), solar shock(s), fluid dynamics, iridescence(s), goniochromism(s), structural coloration(s), pearlescence(s), sound transmission(s), photon receptor(s), photonic crystal(s), wavelength vibration(s), dispersion(s), mirror(s), refractor(s), reflector(s), reflection(s), compiler(s), processor(s), converter(s), code(s), gamut(s), RGB coordinate(s) mixed approximation(s), distortion(s), Doppler shift(s), astronomical properties(s), spectroscopy, anisotropy, isotropy, bioluminescence(s), monitor(s), plane(s), emission line(s), absorption line(s), spectral line(s), plate(s), hue(s), coherencies, intensities, density, opacity, interference(s), interferometric microscopy, interactive interface(s), screen(s), touchable space(s), program(s), game(s), realistic item duplicate(s), vacuum vacancy, bendable energy source(s), synthetic-aperture imaging, off-axis-dark-field illumination technique(s), enhanced sensor(s), replication(s), encoded scene(s), super imposed wavefront(s), speckle(s), reciprocities, photographic plate(s), photoresist(s), photo-thermoplastic(s), photo-polymer(s), photorefractive(s), photorefractive crystal(s), nano-cellulose(s), dichroic filter(s), semiconductor(s), semiconductor heterostructure(s), quantum well(s), plasma(s), embossing(s), electrodeposition(s), entangled particle(s), energy equipment(s), stereopsis, motion(s), gradient(s), color(s), laser(s), pointer(s), diode(s), coherence length(s), phase-conjugate mirror(s), phase shift(s), phase(s), scattering(s), render processing(s), prism(s), relay(s), modulate(s), amplitude(s), numerical aperture(s), visual depiction(s), augmented frequencies, radiation(s), parallax, joule(s), electron holography, transmission electronic microscope(s), interference lithography, acoustic holography, source parameter(s), holographic interferometry, specular holography, dynamic holography, volume hologram(s), spatial resolution(s), pulse(s), reference plate(s), absolute value(s), angle(s), electronic field(s), selective higher resolution medium apparatus, emulsion(s), atomic mirror(s), atom optic(s), ridged mirror(s), atomic hologram(s), neutron expulsion(s), shadow(s), seismic activities, plate tectonic(s), quantum mechanical purpose(s), magnetic propulsion(s), parallel inception(s), nano-vibration(s), neural activities, anti-matter(s), anti-particle(s), anti-force(s), sub-atomic(s), atomic structuring(s), compound bond(s), organic chemical (s), polarity cycle(s), ionic spin(s), inter-dimensional fluctuation(s), covalent charge(s), jet stream(s), lenticular graphing(s), tomography, volumetric display(s), rear-projection(s), semi-transparency screen(s), illumination(s), force field(s), quantifiable hypothetical control barrier(s), meta-data(s), meta-molecular(s), meta-cellular, meta-conscious, meta-physic(s), meta-human characteristic(s), reverberation(s), radiation(s), optical microscopy, optical phase conjugation(s), optical computing(s), optical table(s), optical phenomenon(s), optic (s) beam(s) transgression(s), nonlinear optical material(s), lens trajectories, ambient diffusion(s), Fourier transform(s), diffraction grating(s), polarity current(s), magnetic data(s), photographic recording(s) of light magnetism(s) for sharable multi-dimensional vector(s), various shapes with depth cue(s) calibrations of feature frames between devices formulating data analytics and/or physical characteristics interacting between network renderings of a topographic region relativity connected device(s) and/or viewer(s) and/or mechanical and/or biological retina(s) association(s) adjacently synchronizing renderings to focal distance ratios when virtual object interactions between matter obstacles and/or renderings framing characteristics of physical properties computed involving device(s) qualified retina(s), lens curvature(s), angle(s), direction(s), accelerometer(s), gyroscope(s), receiver(s), network topology, wavelength exposure(s), signal strength(s), size ratio(s), and/or continuous visual camera analysis for angle probabilities, alternate diagnostics, and/or captured surrounding(s) correlating precision accuracy meters scaling focal placing between dimensional processor volume limits distributing between adjacent parallel frames developing artificial intelligence (AI) improvements without limiting the art scope of this invention.

In one embodiment, the digital map 70 shows the same graphed geo-spatial location in two separate realms, with the original graph acting as the digital grid of virtual object(s) and obstacle(s). The system will compute predicted angles of the digital artificial device, and mathematically computed surroundings which are stored in a server to better analyze the scene. Physical device angle ratios captured with real-world accuracy are used in the analysis of a topographic regional grid placing virtual objects relative to any devices and/or physical obstacle formulated at the scene at some distance. This formulation may use any qualified retina(s), lens curvatures, angle direction(s), accelerometer(s), network topologies, wavelength exposure(s), signal strength(s), size ratio(s), and/or continuous visual camera analysis, to determine where in the digitally framed artificial environment of the real-world topographic region and surroundings might reside. Geospacial collaborations and advanced algorithms are processed in an original server accurately rendering objects in reality relative to devices. This is accomplished by replicating the expected results of the digital artificial device on the original server comparable to actual results of the physical device harnessed through the connected device server. The same geo-spatial ratio diagnostic makeup and dissection can be placed on the original digital grid server. The server or otherwise calibrated servers adjust the spatial experiential objects within the topographical region grids and have been calibrated for precision accuracy relative to more than one device. Servers will immediately display the sharable rendering on connected network devices as placed correctly by camera analysis to real-time necessary dimensions between a network of devices. This shared experience is a shared topographic region along the surface level positive subgraph Z-axis, X-axis, and/or Y-axis hosting charted areas capable of correlating virtual objects viewable when in range of devices connected to networks sharing multi-dimensional renderings stored on at least one (1) server. Additionally, multiple servers and multiple parallel sub-graphs may compare frames between grids and/or place subgraph renderings in further subgraphs without limiting the scope of art for this invention.

The relative ratios of spatial experiential objects 74 placed in the digital map 70 is associated with designated frames before comprehensively comparing the device camera analysis of predicted frames from reality. The topographic regions then compartmentalize the environment with respect to device qualified retina(s), lens curvatures, angle direction(s), accelerometer(s), distance(s), network topologies, wavelength exposure(s), signal strength(s), size ratio(s), gyroscope(s), shadow(s), fluid dynamic shadows and/or continuous visual camera analysis for angles, alternate diagnostics, and/or captured surroundings to restructure the digital map 70 with more accurate dimensions of grid realms. The differences in each digital map of environmental outlines using wave reverberation calculations for framing is recalibrated into placement algorithms correlating any multi-dimensional virtual object and/or device coordinates. Virtual objects or spatial experiential objects associated with topographic regions placing renderings in the universal grid are sharable with connected devices of networks in range. Hardware sensors form foundational metrics of an original graph for consistency of meshed topographic regions with the universal grid as constants are derived from the differences of topographic environmental camera analysis and/or relative virtual object frames to device correlation diagnostics. Devices may include at least one (1) matrix of lights connected to server networks monitoring the geo-spatial coordinates of virtual objects in at least one (1) digital graph as a realm to pin-point multi-dimensional wave correlation(s) within device ranges. The software for topologic geospatial charting of devices allows accurate correlation between coordinates in a 3D world to accompany camera analytics processing the frame dimensions for better virtual object adjacent alignment within a calibrated parallel original graph meters and/or central grid system. In addition, placing multi-dimensional virtual object(s) correlation(s) with planar coordinates of each axis allows meshed topographic regions to form for device(s) connection(s) and/or network(s) and/or server(s) rendering placement(s) without limiting the scope of art for this invention.

A digital library 72 is maintained by the server 40 and the digital library 72 includes an augmented reality profile of spatial experiential objects 74, which augment physical objects 76 and the space with metaphysical objects 78, virtual objects 80, and metavirtual objects 82. By way of example and not by way of limitation, the metaphysical object 78 may include the augmented reality viewable information 88 regarding the cleaning schedule of bookshelf B and the living room. The virtual cat C is an example of the virtual object 80, and the rate at which the cat ages, the augmented reality viewable information 92, is an example of the metavirtual object 82.

With respect to physical objects 76, physical objects refer to actual tangible things that people can see and interact with. This may include those elements of the physical world that humans would reasonably detect with their five senses, and can interact with, or inspect directly, without any additional technology assistance. Even though using additional technology, such as a personal computer to study, would be much faster, and yield details about elements that were otherwise invisible. Elements requiring an extra-human process in a physical or virtual sense for their detection, are said to be metaphysical or metavirtual in their nature. Someone might swim over to a buoy in the water and grab onto it because they know that it is there without detecting it virtually, and another person might plug a lamp into a 120 or 240 volt outlet, quickly flick it on, and then turn off again, as a test. However, the user has learned of several nondetectable elements, that the switch is associated with the bulb, and that the lamp will not suddenly turn on by itself without first toggling the switch. The user also expects that it will work the next time they go to turn it on. Some of the more refined elements of the lamp's nature are metaphysical or metavirtual, whereas the overt detectability of the buoy before applying any calculations makes the buoy physical or virtual in nature.

With respect to the metaphysical objects 78, there may be a lot to know about each situation that is not immediately apparent, not visible to the naked eye, might be linked in behavior to something else, or could be aspects of the environment, that had the user known about, would have changed their decision. This is the realm of the metaphysical, which includes all of the aspects of the physical layer that people simply cannot detect without tool and technique. Even though it may be possible to influence these metaphysical constructs by manipulating physical things, elements are considered 'meta' because of the requirement that the person use a tool or technique outside of their senses in element's discovery. A person might go to turn off the lamp in the previous example, and not know that it is still drawing power from the time that it was last used. Even though the lamp is visibly turned off, it may have begun to emit a dull in strength (but statistically still important) electromagnetic field, without significantly deviating from its electrical baseline. In the case of the buoy, a person might swim up to it, just because they want to see what it is, or perhaps in a survival situation the person is in search of something to hold onto. In either case, they could see that the buoy is electronic and emitting a low-wavelength high-amplitude radio signal. Perhaps the buoy is a source of information and interacting with it digitally would mean details about upcoming weather conditions, or perhaps the augmented metaphysical view of the buoy's movement in the waves would yield a degrees-of-freedom value, for the number of degrees in relation to the horizon that the buoy moves back and forth. Especially if the buoy is equipped with its own sensor, and historical data, the user might even compare the waves at the present moment to those seen historically and infer something about future weather conditions.

Other kinds of metaphysical entities, such as radio waves, and although invisible, are most certainly a part of the environment. Unless there is enough energy to feel the waves, or a recipient device that can utilize in some capacity, there may be no way to tell that they are there. A user might download a piece of software that makes a heatmap of wireless signals, or an app that shows the magnitude of one specific type of signal, but as it stands, and for the ordinary person, the ability to map radio signals is somewhat limited and non-trivial. A sensing network provides a unique opportunity to map radio signals, as there is a sensing density, in other words, a volume of sensors working together simultaneously that can measure or estimate details about radio signals. Furthermore, a sensor that is equipped with a special type of antenna, can calculate the direction that a signal came from in relation to the magnitude of the signal. This vector (magnitude and direction), from a single point is already enough to roughly pinpoint the point-of-origin of a signal. However, with the addition of multiple perspectives, that is, a fleet of sensors that each determine a vector for the same signal, information can be combined in a way to not only create a much more accurate account of the signal, but also create an accurate volumetric account of the signal. By tracing specific waves to their destination from the perspective of the point-of-origin, and through the eyes of many sensors, can also include how that wave might deflect off of the line-of-sight surface. An example of a difficult to see metaphysical entity might include a neutrino discharge from a chemical reaction or simply from outer space. In Antarctica there is a scientific project dubbed 'IceCube' that seeks to detect particles from space with an array of light sensors buried in the ice. The project is named IceCube, because there are layers upon layers of light sensors which are arranged in a three-dimensional grid within the ice. The sensors are drilled into the ice, because even though these neutrinos are extremely small, they are still detectable when they do happen to collide with solid matter and produce light. For reference, the atoms of gases like hydrogen and oxygen, are both diatomic. In nature, they are found bound to themselves as they are most stable this way (e.g., H2 and O2). The problem with detecting neutrino discharges in the air, has a lot to do with the density of these gases in the atmosphere. Their energy state is far higher than that of liquids or frozen solids, which means that the chances of a neutrino discharge in confined spaces of air, are much lower than that of a confined space of a more dense material like frozen water. The radio waves in the context of a sensing network, similar to the IceCube project, will yield a volumetric account of the existence of something that is otherwise not visible. Just as the IceCube project helps to visualize neutrino movement through the ice, the space sensing platform can help to visualize signal propagation throughout the air, and other metaphysical events more generally that humans can't usually experience themselves. For example, the scientists in the Antarctic might use the platform to witness a neutrino discharge as if they themselves were in the ice, replaying previous discharges, or overlaying them so that they can see both events simultaneously. Likewise, a team of scientists studying wireless signals might arrange groups of space sensors to witness radio waves moving through the air, or the person swimming towards the buoy might use the system to see the angular motion of the waves. We call these invisible elements of visible things, the metaphysical.

One controversial example of metaphysical objects includes the phenomena known as 'ghost'. Whether ghosts are real or not is not particularly relevant for the sake of this argument. However, a huge portion of the population believes in the phenomena for various reasons. As such, the term itself is difficult to define, as some people believe that ghosts are spiritual in nature, possibly dead loved ones, while others believe that ghosts are an electromagnetic phenomena, or possibly linked to the idea that there is a collective consciousness. In any sense, 'ghost' is an example of something that can be classified as theoretically invisible, still having metaphysical aspects that make it real. Classifying 'ghost', and forming a baseline for what ghosts are, provides a universally agreeable baseline that might sound something like, "A detectable supernatural phenomenon appearing to have metaphysical properties for which there's no definitive explanation."

Virtual objects are constructs that exist as data that are detectable virtually to the user and the user's senses. They may or may not relate to physical locations and things. In the context of augmented reality, they tend to have relations to, and are commonly used to enhance the perception of the physical world. Virtual objects may be representative of physical objects, even when the original physical object has been removed, or never existed. Perhaps virtual and meta-virtual constructs are relatable to physical and metaphysical constructs if society decides that life itself is 'virtual' in nature. The system might draw radio waves, illuminating the rays with light as if the system were a ray tracer, and for the purpose of making the waves detectable to the user. The system might also overlay the precise angular motion of the buoy for the user to see, making its metaphysical constructs somewhat real and predictable. Virtual constructs bring objects in general to the awareness of the user's five major senses. In a truly immersive virtual environment, the user can reach out and interact with virtual objects as if they were real. They can see them, feel texture, possibly even smell and taste the aspects of virtual spaces. Likewise, and as video games have shown us, there are many virtual objects that are created separate from physical space altogether. Things that we wish existed, that never did. Places to get away to. Non-player characters, machine intelligence, or possibly artificially intelligent beings to talk to, including virtual representations of humans who use the system to communicate. People, places, and things exist whether talking about physical or virtual space, and may be of equal importance to the user.

This brings us to the metavirtual objects 82. Just as the physical world can have metaphysical properties, including behaviors, non-visible aspects, and relationships that are otherwise undetectable, virtual spaces have metavirtual elements as well. When we are talking about using the system for augmented reality or virtual reality, highly immersive aspects are just as important. Suppose there is a universal speed limit within the virtual world for how quickly aspects of the virtual world can affect other distant aspects of the world. A rule that happens to govern how quickly changes can propagate throughout the entire virtual field. In physics we might call this the speed of light, but the important point to drive home is that there is a connectedness between virtual aspects of the world, and so, this would be a metavirtual speed limit. Suppose now, that it's discovered that an aspect of world can propagate past the propagation speed limit or barrier that was set for it. In the physical realm something similar to this is called quantum entanglement. Entangled particles in physical space are linked in such a way that they would appear to surpass the speed of light. A metaphysical aspect between the particles is that they have this connectedness. Whatever happens to one, seems to happen to the other and vice versa. There are now properties of virtual objects that although explainable by physical concepts, have a connectedness that is otherwise not visible in virtual space. In some cases, this is a direct result of how it was created, and in other cases the connectedness exists to enhance the experience, granting users the ultimate gift of true autonomy.

Some of these metavirtual aspects might be renderable in a derived virtual space. However, many of them will be invisible unless the user creates a set of rules that allow these to become visible as well. A simple metavirtual construct might look like two spinning cubes, where one spins at twice the rate of the other. For the purpose of rendering, the relationship, 2×, is not shown, but it can be deduced via experimental means that the metavirtual relationship between one cube and the other is 2×, where the result is the rotational velocity as compared to the second cube. From the perspective of the second cube the relationship would be 0.5× or half as much of the rotational velocity with respect to the first cube. The important part to remember is that, to the user, it is not always apparent, which is the chicken or the egg, so to speak. It could go either way, and so the system switches between contexts so that it can see relationships between constructs from each perspective simultaneously. Users can debate about it, but the developer wants to enhance the experience by adding metavirtual constructs between things. In order to facilitate a world where users can see the uniqueness of the environment in a way that only they can, the developers have added additional complexity that would ideally be beyond the comprehension of any one user.

To effectuate the augmented reality platform 10, the server 40 includes a synchronization interface that provides the augmented reality profile(s) of spatial experimental objects 74 to the augmented reality devices 22. Importantly, in one implementation, the server 40 enables a shared experience or an instanced experience—an experience separate from the shared experience with respect to the individuals $I_1$ through $I_4$. Also, the server 40 enables different lenses for the experiences; namely, a symmetrical hardware experience may be provided or a symmetrical hardware experience may be provided.

Figure 2:
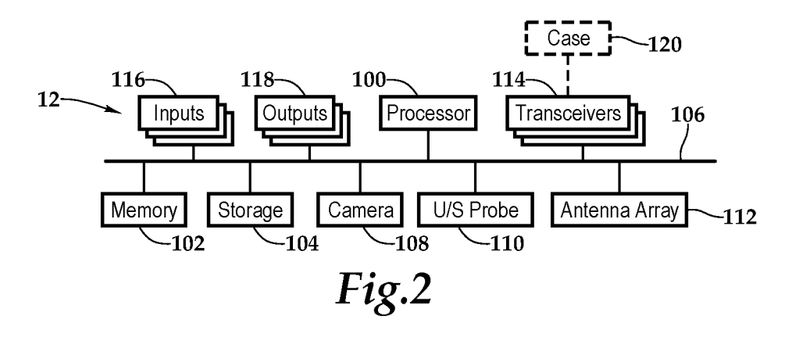
FIG. 2 is a functional block diagram depicting one embodiment of a locationing device presented in FIGS. 1B and 1C.

Referring to FIG. 2, the locationing device 12 may be embodied in a wide variety of devices, as discussed above, from camera nodes 14, 16, a robotic camera node 18, and a collar-mounted camera node 20. In one embodiment, the locationing device 12 includes a processor 100, memory 102, and storage 104 interconnected by a bus architecture 106 within a mounting architecture that supports a camera 108, an ultrasound probe 110, an antenna array 112, a transceiver 114, inputs 116, and outputs 118. The processor 100 may process instructions for execution within the computing device, including instructions stored in the memory 102 or in storage 104. The memory 102 stores information within the computing device. In one implementation, the memory 102 is a volatile memory unit or units. In another implementation, the memory 102 is a non-volatile memory unit or units. Storage 104 provides capacity that is capable of providing mass storage for the locationing device 12. Various inputs 116 and outputs 118 provide connections to and from the computing device, wherein the inputs 116 are the signals or data received by the locationing device 12, and the outputs 118 are the signals or data sent from the locationing device 12.

One or more transceivers 114 may be associated with the locationing device 114 and communicatively disposed with the bus 106. The transceivers 114 may be internal, external, or a combination thereof to the housing. Further, the transceivers 114 may be a transmitter/receiver, receiver, or an antenna for example and communications may be enabled by a variety of wireless methodologies employed by the transceivers 106, including 802.11, 802.15, and 802.15.4, 3G, 4G, Edge, Wi-Fi, ZigBee, near field communications (NFC), Bluetooth low energy and Bluetooth, for example. Also, infrared (IR) may be utilized.

In one implementation, the locationing device 12 may be utilized for the recognition of physical signatures as a radioacoustic microphone, for example. This provides the locationing device 12 the ability to reconstruct words and phrases from a radiowave secondary to the transmission of radio content itself. For example, as the user's voice vibrates the casing of 120 and/or at least one of the transceivers 114, which may be a transmitting antenna in this implementation, an analog wave signal of the user's voice may be reconstructed. Then, with the application of machine-learning, specific words and phrases may be identified. Further, this technique may be applied to identify specific devices by the electromagnetic distortion or the signature of the electronics, such as the ringing of a processor. Other information may augment the identification process, including actual sound from a microphone, a person's voice or other sounds of machinery. Accordingly, in one embodiment, a radioacoustic microphone is provided by one or more attributes; namely, (1) audible/inaudible soundwaves generated by humans and machines; (2) detectable changes in phase-shift sourced from radiowaves emitted by machines; and (3) specific detectable interference patterns, noise, and latent EMF generated by machines that may be fed through machine-learning.

The memory 102 and storage 104 are accessible to the processor 100 and include processor-executable instructions that, when executed, cause the processor 100 to execute a series of operations. With respect to the processor-executable instructions, the processor is caused to receive and process signals relative to visual-inertial odometry, radio wave positioning, and acoustic positioning. More particularly, the processor-executable instructions cause the processor 100 to determine a perspective value of a physical object based on the visual-inertial odometry, radio wave positioning, and acoustic positioning. The processor-executable instructions then cause the processor 100 to send this information to the server 40.

A core component of the augmented reality platform 10 involves high-accuracy geospatial and directional awareness, which is provided by the locationing devices 12. As signals arrive at each of the nodes defined by the locationing devices 12 and augmented reality devices in the sensing network, the energy will incur a detectable charge at each of the antenna segments on the phased antenna array, which may be antenna array 112. Due to the high-accuracy timing of the node's internal clock, and the incurred charges from each segment after traveling along equidistant wiring, exact nanosecond-scale timestamps can be produced. The known properties of the radio signal, including the precise distance between antenna segments (d), the wavelength of the signal as computed from the frequency in terms of speed of light $\lambda=c/f$, and the phase offset or phase comparison of select signals, are used to determine the angle-of-arrival of tracked radio waves. The phase comparison between incident waves is denoted as $\Delta\varphi$, in other words, the phase difference or shift between the overlapped waves in the same timeframe. To compute the angle-of-arrival then, the following equation is used: $\arcsin(\Delta\varphi\lambda/2\cdot d)$ The practical nature of the kinds of wireless signals that might arrive on the antenna array 112, means that there will almost certainly be noise and other sources of contamination. A low SNR (signal to noise ratio) makes it difficult, especially in closed environments to isolate waves from the background noise, and determine their exact properties for the calculation. As such, there are many techniques that are employed in order to identify primary signals from deflected ones, and to minimize the effects of noise. Some techniques, mentioned in the core of the WDDTAS tracking platform, including low-observable filtration and estimation techniques, define a process by which signals can be isolated from background noise in noisy indoor environments. The process makes use of the asymptotic output from the MUSIC algorithm (MUltiple SIgnal Classification) algorithm in order to determine viable signals for calculation and to better estimate angle-of-arrival (AoA) or direction-of-arrival (DoA). In a more general sense MUSIC is employed here in the presence of noise and is used to isolate specific signals for calculations. The platform looks for the asymptotic output of MUSIC and selects probable signals. One might use MUSIC, and from many samples build a statistical distribution which lets the platform identify outliers by association. Using probabilistic samples within one or two standard deviations from the mean for tracking, means that the platform can achieve high-accuracy, by accounting for the effects of practical wireless transmission indoors. In audio and digital signal processing applications, MUSIC is used to separate human voice from background noise in audio samples, and to isolate individual components of sound. Likewise, the Space platform uses these techniques and additional low-observable processes for identifying individual radio signals from background noise.

The elements of the augmented reality platform 10 may also be equipped with hardware more suited for augmented reality construction. The use of machine vision, including the concurrent tracking of multiple points selected by visual criteria fed into a visual inertial odometry algorithm, allows the sensor to lock onto objects within the hybrid space. Combined with the data from an ultrasonic survey, the sensor can better gauge the depth to objects in the field-of-view for selected imagery and also use this information to build a three-dimensional depth mapping from the perspective of each sensor in the sensing network. The sensor might emit short high-amplitude bursts to determine the distance from the ceiling to the floor, and from wall-to-wall, resulting in an estimate of the size of the room. The administrator can calibrate the system by moving devices out to the corners, edges, and other selected locations of the room, which gives each participant sensor in the calibration, a radio-estimated account of the device's location. This process is similar in nature to radar calibration by dropped scanables from the back of an aircraft, and is applied in this setting for the creation of virtual worlds of light.

The sensing system of the augmented reality platform 10 may be used for improving the resolution of visual inertial odometry and constructive 3D modeling techniques. Visual inertial odometry provides the ability to infer spatial information from camera imagery. However, neighboring sensors provide additional details about the environment, including the ability to sense depth with bursts of sound, such as ultrasound high-frequency depth sensing used in medical and naval applications for measuring waves. Especially In the context of the wireless tracking techniques, the technology has the potential to improve the accuracy of VIO which is limited by the imagery from one or more cameras. It may be the case that the sensor network has identified a relative or absolute position of a wireless device before any imagery is available, which can be used to minimize depth estimation error in visual inertial odometry, which is especially a problem with fast-moving objects and the trajectories or robots and autonomous systems. Likewise, the sensor network might have a depth from its location to the walls, floor, and ceiling, which can correct for the sensed depths from the VIO data, resulting in a high-accuracy 3D imaging solution comprised of data from multiple points, including referenced high-accuracy low-observable techniques. The platform might sense that a device is outside the confines of VIO in combination with echo distance from ultrasound, and choose expand the room, or toss-out outlying data. The platform might also emit many high-amplitude low or high frequency bursts (likely those outside human and animal hearing ranges) and use a joint probabilistic data association JPDA algorithm in combination with the MUSIC algorithm to combat the effects of additional echoes off of objects and walls that were not relevant to the selected calculation or object. As with low-observable techniques the sound result will be passed through a set of filters and laid into tracks for calculation. Multiple sensors may be working together to process the sounds and are spaced a certain distance apart based on selected frequencies.

Figure 3:
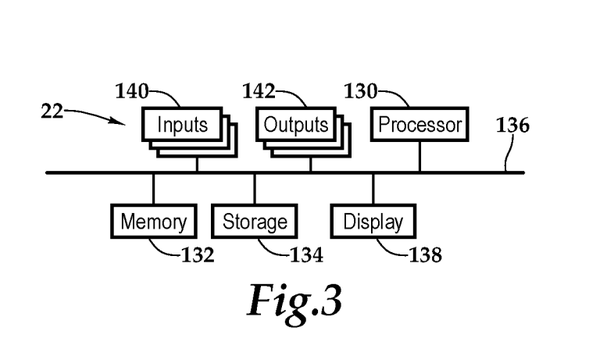
FIG. 3 is a functional block diagram depicting one embodiment of an augmented reality device presented in FIGS. 1B and 1C.

Referring now to FIG. 3, an augmented reality device 22 may be any form of carryable or wearable device as previously discussed. Further, there is no requirement that specific interfaces or inputs/outputs, like a keyboard, a screen, a microphone or a speaker, be present. In one embodiment, the augmented reality device 22 includes a processor 130, memory 132, and storage 134 interconnected by a bus architecture 136 within a mounting architecture that supports a display 138 and various inputs 140 and outputs 142. The processor 130 may process instructions for execution within the computing device, including instructions stored in the memory 132 or in storage 134. The memory 132 stores information within the computing device. In one implementation, the memory 132 is a volatile memory unit or units. In another implementation, the memory 132 is a non-volatile memory unit or units. Storage 134 provides capacity that is capable of providing mass storage for the augmented reality device 22. Various inputs 140 and outputs 142 provide connections to and from the computing device, wherein the inputs 140 are the signals or data received by the augmented reality device 22, and the outputs 142 are the signals or data sent from the augmented reality device 22.

The memory 132 and storage 134 are accessible to the processor 130 and include processor-executable instructions that, when executed, cause the processor 130 to execute a series of operations. With respect to the processor-executable instructions, the processor 130 is caused to receive and process synchronization signals that disclose the augmented reality through the hardware of the augmented reality device 22.

Figure 4:
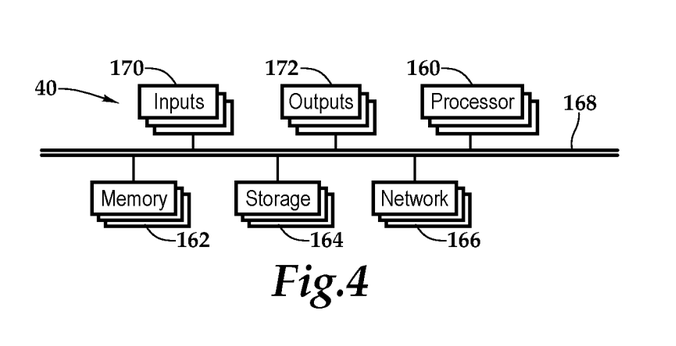
FIG. 4 is a functional block diagram depicting one embodiment of the server presented in FIGS. 1B and 1C.

Referring now to FIG. 4, one embodiment of the server 40 as a computing device includes a processor 160, memory 162, storage 164, and one or more network adapters 166 interconnected with various buses 168 in a common or distributed, for example, mounting architecture, that supports inputs 170 and outputs 172. In other implementations, in the computing device, multiple processors and/or multiple buses may be used, as appropriate, along with multiple memories and types of memory. Further still, in other implementations, multiple computing devices may be provided and operations distributed therebetween. The processor 160 may process instructions for execution within the server 40, including instructions stored in the memory 162 or in storage 164. The memory 162 stores information within the computing device. In one implementation, the memory 162 is a volatile memory unit or units. In another implementation, the memory 162 is a non-volatile memory unit or units. Storage 164 includes capacity that is capable of providing mass storage for the server 40. The various inputs 170 and outputs 172 provide connections to and from the server 40, wherein the inputs 170 are the signals or data received by the server 40, and the outputs 172 are the signals or data sent from the server 40. The network adaptor 166 couples the server 40 to a network such that the server 40 may be part of a network of computers, a local area network (LAN), a wide area network (WAN), an intranet, a network of networks, or the Internet, for example.

The memory 162 and storage 164 are accessible to the processor 160 and include processor-executable instructions that, when executed, cause the processor 160 to execute a series of operations. In one embodiment of processor-executable instructions, the processor-executable instructions cause the processor 160 to determine a decided value of each physical object based on multiple perspective values of the physical object received from the array of locationing devices 22. The processor-executable instructions then cause the processor 160 to update and maintain the digital map 70 accordingly. Then, the processor-executable instructions may access augmented reality profiles in the digital library 72 relative to spatial experiential objects 74. Using synchronization, the processor-executable instructions cause the processor 160 to synchronize the augmented reality devices with the spatial experiential objects 74, which are in appropriate locations based on the updated digital map 70.

Figure 5:
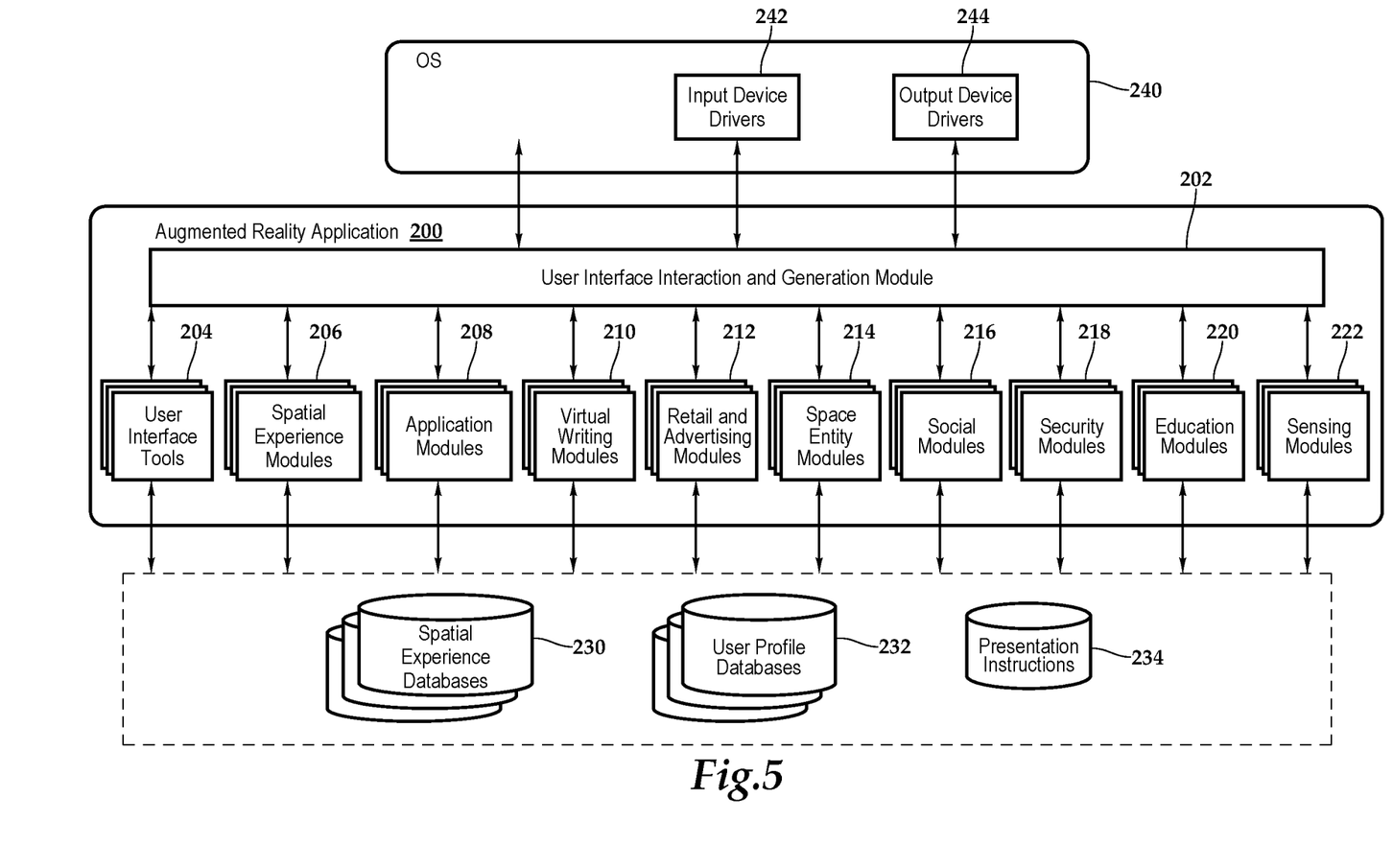
FIG. 5 is a conceptual module diagram depicting a software architecture of an augmented reality application according to some embodiments of the present invention.

Referring now to FIG. 5, a conceptual illustration is presented of the software architecture of an augmented reality application 200 of some embodiments that may utilize the locationing devices 12 and the augmented reality devices 22. In some embodiments, the augmented reality application 200 is a stand-alone application or is integrated into another application, while in other embodiments the application might be implemented within an operating system 240. Furthermore, in some embodiments, the augmented reality application 200 is provided as part of a server-based solution or a cloud-based solution. In some such embodiments, the application 200 is provided via a thin client. That is, the application 200 runs on a server while an individual interacts with the application 200 via a separate machine remote from the server. In other such embodiments, the application 200 is provided via a thick client. That is, the application 200 is distributed from the server to the client machine and runs on the client machine. In other embodiments, the application 200 is partially run on each of the locationing devices 12 and the augmented reality devices 22.

The augmented reality application 200 includes a user interface (UI) interaction and generation module 202, user interface tools 204, spatial experience modules, application modules 208, virtual writing modules 210, retail and advertising modules 212, space entity modules 214, social modules 216, security modules 218, education modules 220, and sensing modules 222. In some embodiments, storages 230, 232, 234, which respectively include spatial experience databases, user profile databases, and presentation instructions, are all stored in one physical storage. In other embodiments, the storages 230, 232, 234 are in separate physical storages, or one of the storages is in one physical storage while the other is in a different physical storage.

With respect to the spatial experience modules 206, the platform might use a physics engine to render metavirtual aspects of the virtual world, and has traits derived from real metaphysical physical relationships, such as gravity, the effects of angular velocity, momentum, and capillary action. The physics engine provides another degree of realism and immersion, but may not always be active, and may not follow physical laws as they are on Earth. The user might go to a store to try on a dress and the engine might simulate wind, processing what it would be like if there were a breeze, simulating what it would feel like to try on a piece of living clothing, as opposed to a static image or overlay. The engine might also be used to match the physical environment, so that the virtual experience can be consistent with the physical experience from the users own zone or planet. Augmented reality lets people see what life might be like with varying aspects applied, bringing out low-gravity, or rending heavy objects as if they were weightless.

A system that simulates a virtual world with physical aspects, shareable by many people, each with their own uses, should foster a unified experience. Yet, there are cases where the unified platform should create virtual layers that are disjoint or "instanced", for individual purposes. Platform owners might create their own shared instanced experiences that form a subset of the greater unified experience. A shared experience may accommodate people from the universal experience into a nested experience automatically based on one or more methods.

In one element of a default experience, the user's augmented reality viewer might select the experience with the highest specificity similar to cascading style sheets (CSS)

rendered in an Internet browser. If the user is in public, or otherwise there is no sensor platform in the area, than the universal shared experienced is loaded for viewing. The default experience is derived from a voronoi partition scheme over the sensor coverage area, with one or more experiences selected by the user's presence on named polygons of the viewable field, a kind of distribution, load balancing and randomness for cases where there are many experiences that the platform operator might want users to see, or for when users populate spaces with many of them and there is no clear default. The default experience could be strictly decided by the owner of a physical property, which disallows nested experiences because the platform is also someone's home. That being said, users may still simply switch to any other experience that they desire, but the default is the same for that property, and thus, the 'homepage' is where the user is standing when they open the viewer software unless they have explicitly specified otherwise.

The reason for a global shared experience is to allow as many people as possible to interact with each other in virtual space. Nested experiences are analogous to websites and are customizable in the virtual environment for many different use-cases and occasions, and populatable with virtual objects and overlays like a blank canvas. The process of switching into a shared experience from a global one gives users and businesses an opportunity to show off their virtual experiences or store-fronts in a manner that is immediately visible when the user first engages with the viewer or puts on the headset. Even though the user might switch into any experience that they desire, the default helps to create communities of people who can expect to see others and other people's artwork, linkable for remote viewing.

Experiences in space might be configured to maintain a historical ledger of changes made to the experience. This mechanic is similar to logging seen on web servers and computer systems for the purposes of maintaining security and improving the user experience. Experiences do not have logging enabled by default, however, experiences that do, can provide historical data for specific times that might be of utility to society. These records are called the arcadian records and symbolize the connectedness of events. Arcadian forms a historical ledger for events across experiences and individual experiences specifically. It is said that when users read from the arcadian records, that they are channeling history.

Artists and developers might create their own augmented reality programs and games that are renderable separately, and available from within an experience. An application can be downloaded, including its resources and functionality from the equivalent of an app store, however, programs may also be encountered naturally inside shared experiences. Users might encounter a world event, which is a continual, timed, triggered, or random on-going program that runs inside one or more shared experiences, each on an independent or synced timeline. A scientist might create multiple identical timelines and test one specific difference in each one, or they might decide to run them separately. Likewise, the user can create and place world events that act as an open-world program that is rooted in the timeline of its container and is synced between users so that each person sees the same thing.

For example, an event at a historic site might continually replay a re-enactment of the events that took place during a specific period in the past. Although the objects are placeable without any programming knowledge on behalf of the user placing them, there may be an event running that defines user interactions and automates aspects of the scene for viewers to learn about what happened at the site. Users might play a role or play as a historical figure for the purpose of education, and then return back to the greater experience, or physical lives after re-living part of the figure's life through technology. The user might otherwise ignore the event and move on through cyberspace to the next topic at the scene.

Breaking experiences down into nested experiences, bundling rated applications, and searchable artworks, helps to improve the quality gap so that the world does not become cluttered, but still giving people the freedom to build whatever they want. Over time, art that has been placed in the global shared experience (Public Space) might eventually be marked as public property, which changes that ability to edit from the 'owner' to 'anyone'. Works might be set to degrade after a set period of time to prevent clutter by the owner. Public objects might be tended to by others with utility, allowing them to continue being non-editable, even though the owner may have changed to anyone. This is a mechanic to help maintain objects that a community deems important in public spaces. If people in the area like something then it should stay, and likewise be garbage collected or removed if it is profane or otherwise not interesting to the community.

Public programs are not technically global in nature, as they are encountered in the user's geographic location, however have varied mechanics for the purpose of security. Mainly, there may be a quality threshold for public programs and world events, ownership timers are limited, programs with negative utility will be removed, and their existence is maintained by the community. Part of interacting with the digital world includes the multiple lenses that one might use to get there. This means many devices with varied hardware capabilities. Some devices may not even have a screen, and so, part of the experience is the ability to interact with space intuitively. Even when there is no graphical user interface present, the user might talk to their friends in cyberspace, or perhaps their voice assistant (what a sadness) and interact with components and files. A user might select one or more of their files with the spoken or unspoken voice, which brings those selected objects into context. Likewise, a user might be given a storable object such as a book, bringing the written material into context, and then decide to look directly up at the sky to imply that it should be uploaded to space. Depending on context, the user might also store objects in the cloud, which is closer to the ground in its nature.

A user might share a piece of content with another user, by directing content at them, which could involve pointing the viewer at another device, and performing the copy or move actions. When performing these actions on devices that are controlled by you, the text might say 'copy to'. In cases where an action or gesture is being performed on neighboring devices, it might say 'share with'. The augmented reality mentality outlines both graphical and contextual aspects. This is because reality isn't only visual in nature, and neither should augmented reality. Users should be able to feel and intuitively understand what is happening around them as second nature to the things that they already do experience. Aspects might be tuned to each of the user's senses as the technology progresses. Most devices at the present time have a screen, camera, speaker, and microphone among many on-board environmental sensors.

With what is present, the interface should provide as much detail as possible. When there is a graphical component such as a viewer that has a screen or worn lenses, each of the Space Things can be overlaid on-top of the environment. Users could be wearing a monocle or eye-patch, necklace or badge, ring or watch. They could have a phone, tablet, laptop, or desktop. The user might also have embedded electronics in their clothing, or even themselves. Whatever it happens to be, the platform should be useful in some way, and provide a universal utility with many entry-points into cyberspace.

Application modules 208 may provide the equivalent of menus that might be drawn around objects in a listed radial fashion and might say something different based on context and other conditions. Users can place a spherical navigator on the screen that is not completely opaque and has spokes which point in the direction that the user would need to go to complete an action or navigation, including places that they might find people, places, or things. The user might swap between a heads-up display that shows their device status, their body's status, or otherwise a brief overview of the internal in contrast to the external. For this, a user might inspect a neighboring avatar or device, and in some circumstances information will be available, and a similar overview would appear above or in-front of it.

With respect to virtual writing modules 210, a user might dictate what they want to write into a text field, use a standard textual input method, recognition sticker, or even copy text from the sides of physical objects into virtual spaces with optical content recognition, and trainings for the user's language. A user might look at a shopping list, issue the copy command, and look at any virtual object that has a textual input field on it, and hit paste. This should be very familiar to computing concepts for users. The accuracy of wireless signals, visual odometry, light-field estimation, and/or sonic ranging in relation to the accelerometer makes rotating virtual objects in each hand or with a device much more accurate than any technique on its own. As the user rotates a physical notepad the edges of the pad are detectable with VIO, and the writings can be imported into a virtual pad.

With respect to retail and advertising modules 212, advertising in a hybrid space has many advantages for both consumers and advertisers. The things that people want to buy are often nearer to the consumer than they realize. Although the user might use the platform to initiate a global purchase from an online market, the user might also see results from nearby stores that have that item. Geospatial positioning of items in-store allows the network to maintain central-hierarchical and distributed listings of items, where common information about local listings are stored nearer to users in the community. Items that have electronic product tags, especially with wireless hardware on-board, bear numeric identifiers that are easily searchable and sortable with common techniques, including storable as community-level distributed hashmaps of pointers to places where you might find items. This system brings visibility into a physical storefront from outside the store. It means that the user can search for what they are looking for in a consistent manner that yields physical and digital results on the Internet-for-Things. This means that items are discoverable naturally, and when users already know what kinds of items they are looking for.

Space entity modules 214 are most every type of object that is not metavirtual in nature would be classified into categories called Things. Some Things have common behavior that each thing of that category exhibits, while other things, like user artworks, are more abstract, and are a blank canvas for users to build upon. These are entities in the virtual world that users can interact with that are visible or placeable in their nature to/for at least one person. Since the user interface and the virtual landscape are so highly intertwined, many things are actually more analogous to UI elements. In a web browser, you might use HTML to describe the structure of a page, CSS to describe the styles of the structure, and JavaScript to describe the functionality. In space there is a similar separation of Model, View, and Controller, that makes it easy to build living virtual environments by using behaviors from pre-existing components in combination with your arts.

With respect to social modules 216, as is common in online forums and games, users might have virtual representations of themselves and/or agent avatars which is a virtual representation of a physical person, handle or identity. Both people and agent avatars are interactable by others and are selectable/tappable leading to several options for common interactions, including those exported by third-party applications that the user currently has installed. Agent avatars form one kind of object, that some users may have seen, which are mechanically similar to badge objects used for company logos and links to named spaces, analogous to heading to a company's website by clicking on the company's logo anywhere that it is seen. Avatars and badges are a type of space thing that has a pre-defined behavior that might bring other users to the details about a user, or to another experience.

With respect to security modules 218, internal authentication and external authentication are provided. The administrator or home-owner might install the Space system for the augmented reality experience, but also choose to enable a feature that allows them to validate security transactions. This could include transactions involving dangerous construction equipment and weapons such as protocol-compatible table saw or gun, proving an extra layer of safety in either case. The compatible device speaks the protocol language and will only activate when the holder has both triggered the equipment, and the sensor network has come to consensus that the activation criteria are met. Sane defaults for activation criteria might dictate that the owner of the equipment is the only person allowed to activate it. Likewise, the equipment might designed so that it will not activate outside of a certain area, and possibly without a secondary-factor present. As an example of this, the administrator might enable 2FA requiring them to have at least two or more verified factors. (Something you have, something you know, something you are)

Education modules 210 provide, in an educational setting, the multiple components that are useful for augmenting reality in Space. Some of these components mimic physical educational concepts, while others offer an interesting spin on the learning process. The goal is to create a platform that offers a new way for people to learn together that is both useful inside and outside of a common educational setting. Additionally, the hope is to help shape the educational process to make it more open and transparent to teachers and students. Many of these components foster a peer-based model, bringing students together to teach each other with many subject matter experts preset. This is different from a top-down hierarchical model of education where a standardized set of material is taught to students. The platform is however useful in both cases.

Sensing modules 222 provide whiteboard and notes and other items. The user might place a component such as a whiteboard that other users can write on. They can use the board to share their ideas with other users. The whiteboard has the default behavior of being a written surface with multiple tracks for each user who writes on it. Individual users might erase what they have written, or the owner might erase the whiteboard, clears it for more ideas. An educational experience can be generated that has multiple parties who are facing the subject component, which is chosen by vote, or by the instance creator. As the subject changes, people in the experience might be looking at the whiteboard, another placeable component or an artwork as they communicate between each other.

Sensing modules add aspects to the locationing network. For example, a drone equipped with VIO might fly through a Space-equipped area, and simultaneously be issued geospatial metadata as it flies though that area. It might be told about the dimensions of the room from the sensor network's perspective, corrected to accounts of geospatial information from each sensor in the network. The network might tell the drone about the perceived location of the drone in relation to the Space sensors, and if the drone speaks the sensor network protocol, it might act as a sensor itself, and relay additional VIO depth-mapped imagery or another geospatial account (say the drone also has ultrasound sensors) of the room and objects back to the sensor neighbors in the network, who will then use that information or filter it out if it is clear that the data is outlying and does not align to the calculation tracks. This functionality improves the overall accuracy for users connecting to the platform. Better placement of objects in virtual space, especially overlaying virtual objects accurately on-top of physical objects or for moving applications, makes for a more real-time and immersive experience. The platform might compare the properties of wireless frames, and each of the capabilities of the wireless hardware, including the number of overlapping vendor-portion tagged parameters in 802.11 wireless traffic. The signature algorithm might also include the sound of the hardware of devices. For example, the sound of a car's engine, the electromagnetic ringing of a processor at its frequency, or the ticking of a watch or clock.

The UI interaction and generation module 202 generates a user interface, depending on the hardware available that allows the end user to experience the augmented reality. Various modules may be called to execute the functions described herein. In the illustrated embodiment, FIG. 5 also includes an operating system 240 that includes input device drivers 242 and output device drivers 244. In some embodiments, as illustrated, the input device drivers 242 and the output device drivers 244 are part of the operating system 240 even when the augmented reality application 200 is an application separate from the operating system 240.

Figure 6:
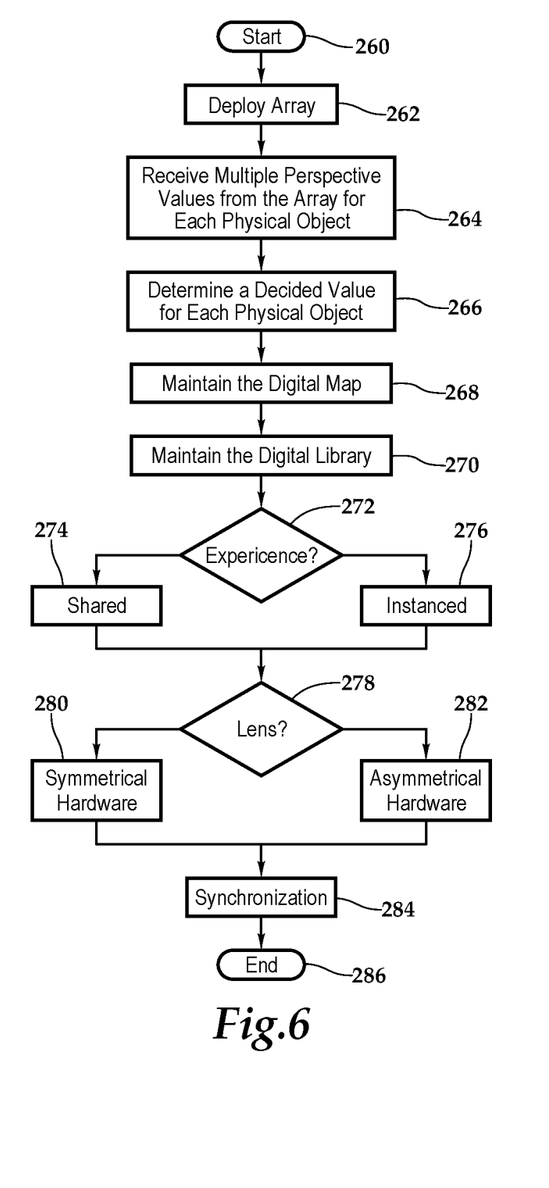
FIG. 6 is a flow chart depicting one embodiment of a method for providing augmented reality according to the teachings presented herein.

Referring now to FIG. 6, a method for implementing augmented reality is depicted, which starts at block 260. At block 262, an array of locationing devices are deployed in a physical space that will have augmented reality. At block 264, multiple perspective values from the array of locationing devices are received at a server for each physical object in the physical space. At block 266, through a consensus process, the server will determine a decided value for each physical object. At block 268, the decided values for each physical object are updated in a digital map. Additionally, at block 270, the server maintains a digital library of the spatial experiential objects that will be used for the augmented reality. At decision block 272, the individual may select a shared experience (block 274) or an instanced experience (block 276). At decision block 278, the individual may select the lens for the augmented reality experience; namely, a symmetrical hardware experience (block 280) or an asymmetrical hardware experience (block 282). At block 284 the server performs the necessary synchronization with the augmented reality devices prior to the methodology ending at block 286.

Figure 7:
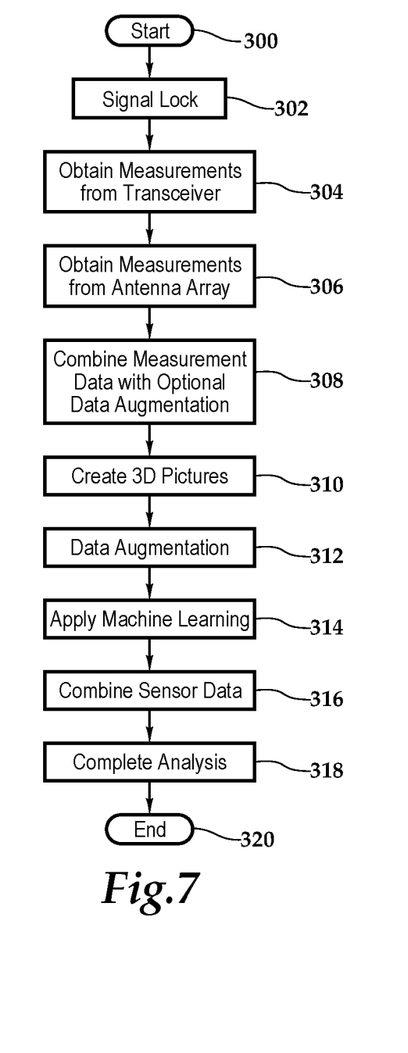
FIG. 7 is a flow chart depicting one embodiment of a method for recognition of physical signatures, which may be incorporated into the teachings presented herein.

Referring now to FIG. 7, one embodiment of a method for recognition of physical signatures is depicted. In one implementation, the systems presented herein might compare the properties of wireless frames and each of the capabilities of the wireless hardware, including the number of overlapping vendor-portion tagged parameters in wireless traffic. A signature algorithm may also include sound related to device hardware, such as a sound of a car's engine, electromagnetic ringing of a processor at a frequency, or ticking of a watch, for example. Additionally, the systems may create biosignatures for people based on characteristics like heartbeat, breathing, skin conductivity, behavior, height, sound, and voice. The systems may also analyze sound from non-microphone sources, and build radio-acoustic signatures for devices, even in cases where the device is not compatible with the protocol.

Small but detectable Doppler-shifts in frequencies of electromagnetic waves pass across the antenna array for segments thereof. These detectable Doppler-shifts in frequency are produced by devices with antennas that are mechanically vibrating due to ambient sound and eventually reaching a sensor for detection. Such small changes are detectable with sensitive power meters and, in one implementation, a methodology that is initiated at block 300. At block 302, a signal lock occurs. In one embodiment, the aforementioned MUSIC algorithm is utilized with probabilistic associations to lock onto a signal. At block 304, measurements are obtained from one or more transceivers. Changes, including very small changes, may be measured in Doppler phase-shifts being emitted by the transmitter's antenna. At block 306, the obtained measurements are combined and then optional augmented at block with 308 with measurement data obtained from an antenna array. Such measurements may include Angle of Arrival (AoA) measurements, calibrated to time measurements, and time-delay of arrival (TDOA) measurements. At block 310, 3D pictures of the applicable waveform are created with the use of quadrature amplitude modulation (QAM) or quadrature frequency modulation (QFM) or the like. At block 312, the data may be augmented with receiving magnitude information related to the locked signal or locked signals. At block 314, machine learning is applied, including state estimation techniques, to train the algorithm to recognize individual words, phrases, sounds and the like to enable the system to continue to detect audio from radio waves. At block 316, data is combined using sensor fusion, for example, to improve the quality of radio acoustic analysis. At block 318, the analysis is completed to detect the audio from radio waves before the methodology ends at block 320.

The order of execution or performance of the methods and data flows illustrated and described herein is not essential, unless otherwise specified. That is, elements of the methods and data flows may be performed in any order, unless otherwise specified, and that the methods may include more or less elements than those disclosed herein. For example, it is contemplated that executing or performing a particular element before, contemporaneously with, or after another element are all possible sequences of execution.

While this invention has been described with reference to illustrative embodiments, this description is not intended to be construed in a limiting sense. Various modifications and combinations of the illustrative embodiments as well as other embodiments of the invention, will be apparent to persons skilled in the art upon reference to the description. It is, therefore, intended that the appended claims encompass any such modifications or embodiments.

What is claimed is:

1. An augmented reality platform comprising:
   an array of locationing devices within a space, each locationing device having a locationing device identification providing an accurately-known location within the space;
   at least one locationing device of the array of location devices configured to determine a perspective value of a physical object within the space based on at least one of: visual-inertial odometry, radio wave positioning, or acoustic positioning;
   a server remotely located to the space and in communication with the array of locationing devices, the server determining a decided value of the physical object based on at least one perspective value of the physical object received from the at least one locationing device;
   a digital map maintained by the server, the digital map including a first location of the physical object and a second location of a spatial experiential object;
   a digital library maintained by the server, the digital library including an augmented reality profile of the spatial experiential object; and
   the server having a synchronization interface, the synchronization interface providing the augmented reality profile and second location of the spatial experiential object to an augmented reality device.

2. The augmented reality platform as recited in claim 1, wherein the physical object further comprises a tangible thing.

3. The augmented reality platform as recited in claim 1, wherein the spatial experiential object comprises a metaphysical object.

4. The augmented reality platform as recited in claim 1, wherein the spatial experiential object comprises a virtual object.

5. The augmented reality platform as recited in claim 1, wherein the spatial experiential object comprises a metavirtual object.

6. The augmented reality platform as recited in claim 1, wherein the digital map and the digital library, in combination, provide a shared experience available to a plurality of users.

7. The augmented reality platform as recited in claim 1, wherein the digital map and the digital library, in combination, provide an instanced experience.

8. The augmented reality platform as recited in claim 1, wherein the augmented reality device provides a display, a camera, a speaker, and a microphone.

9. The augmented reality platform as recited in claim 1, wherein the augmented reality device provides a subset of a display, a camera, a speaker, and a microphone.

10. The augmented reality platform as recited in claim 1, wherein the synchronization interface provides the augmented reality profile and second location of the spatial experiential object to a first augmented reality device and a second augmented reality device, the first augmented reality device and the second augmented reality device comprise varied hardware capacities.

11. The augmented reality platform as recited in claim 1, wherein the locationing device comprises a plurality of camera nodes.

12. The augmented reality platform as recited in claim 1, wherein the locationing device comprises a robotic camera node.

13. The augmented reality platform as recited in claim 1, wherein the locationing device comprises a collar-mounted camera node.

14. The augmented reality platform as recited in claim 1, wherein the augmented reality device comprises a wearable device.

15. The augmented reality platform as recited in claim 1, wherein the augmented reality device comprises a smartphone or smart glasses.

16. An augmented reality platform comprising:
    an array of locationing devices within a space, each locationing device having a locationing device identification providing an accurately-known location within the space;
    at least one locationing device of the array of location devices configured to determine a perspective value of a physical object within the space based on visual-inertial odometry and radio wave positioning;
    a server remotely located to the space and in communication with the array of locationing devices, the server determining a decided value of the physical object based on least one perspective value of the physical object received from the at least one locationing device;
    a digital map maintained by the server, the digital map including a first location of the physical object and a second location of a spatial experiential object;
    a digital library maintained by the server, the digital library including an augmented reality profile of the spatial experiential object; and
    the server having a synchronization interface, the synchronization interface providing the augmented reality profile and second location of the spatial experiential object to an augmented reality device.

17. An augmented reality platform comprising:
    an array of locationing devices within a space, each locationing device having a locationing device identification providing an accurately-known location within the space;
    at least one locationing device of the array of location devices configured to determine a perspective value of a physical object within the space based on visual-inertial odometry;
    a server remotely located to the space and in communication with the array of locationing devices, the server determining a decided value of the physical object based on at least one perspective value of the physical object received from the at least one locationing device;
    a digital map maintained by the server, the digital map including a first location of the physical object and a second location of a spatial experiential object;
    a digital library maintained by the server, the digital library including an augmented reality profile of the spatial experiential object; and
    the server having a synchronization interface, the synchronization interface providing the augmented reality profile and second location of the spatial experiential object to an augmented reality device comprising a wearable device.

* * * * *